July 22, 1958 C. J. E. OMERON 2,844,180
SAFETY RIM STRUCTURE
Filed April 25, 1955
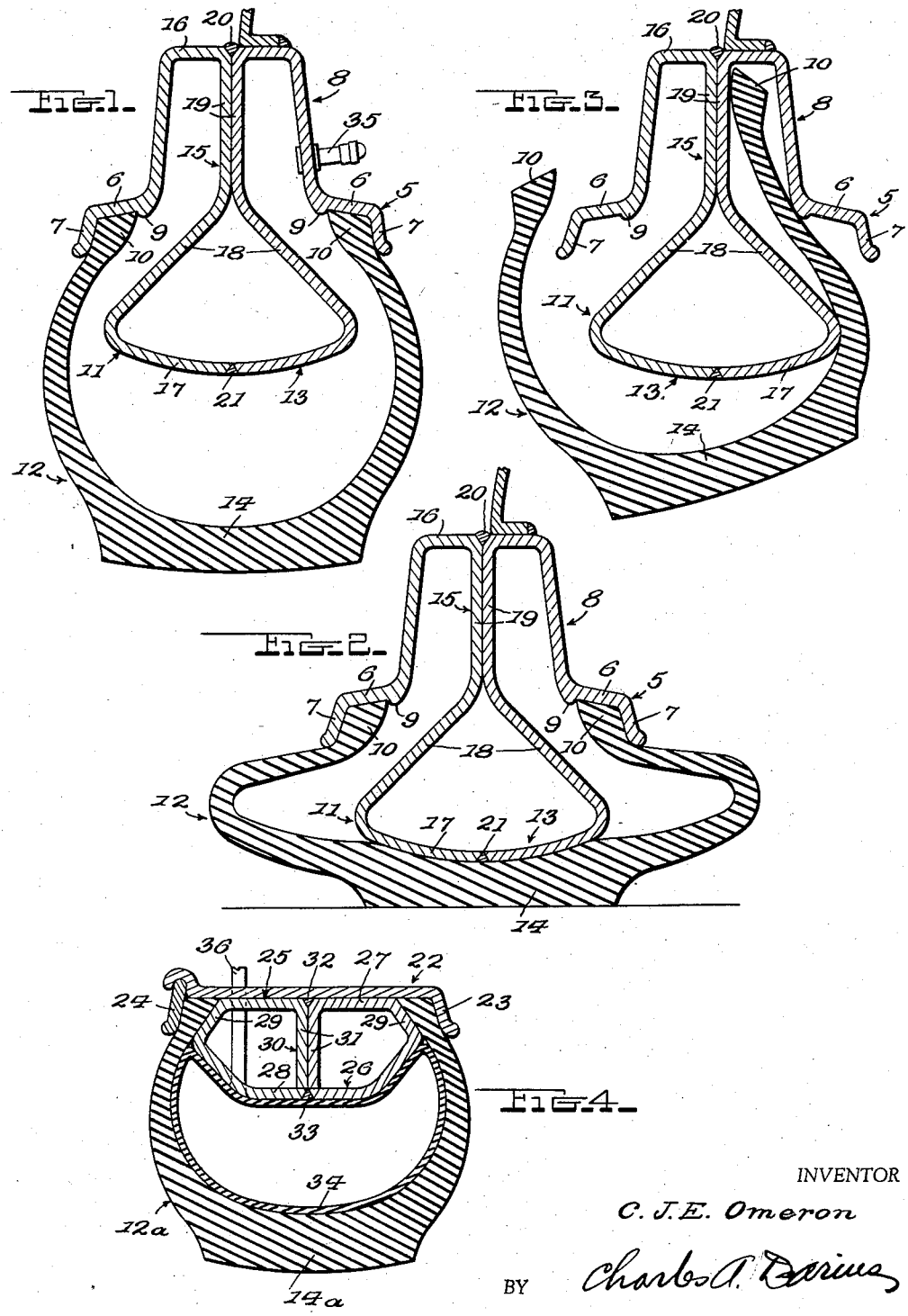
INVENTOR
C. J. E. Omeron
BY Charles A. Barnes
ATTORNEY.

United States Patent Office 2,844,180
Patented July 22, 1958

2,844,180

SAFETY RIM STRUCTURE

Carl J. E. Omeron, Los Angeles, Calif.

Application April 25, 1955, Serial No. 503,373

1 Claim. (Cl. 152—158)

This invention is designed to provide an improved rim structure for motor vehicles which will permit the driver to come to a safe stop in case of blow-out and will also prevent rim-cutting of the tire while the stop is being made.

In carrying out the above end, a further object of the invention is to provide a novel rim structure embodying both a tire-carrying rim and a safety rim, the latter being within the tire and being cooperable with the tread portion of the latter to limit the descent of the wheel in case of blow-out.

Another object of the invention is to provide a novel rim structure including the safety rim and well adapted for use with modern tubeless tires.

Yet another object is to provide a novel rim construction embodying the safety rim and specially constructed for truck and bus wheels in which it is necessary to provide a removable bead-engaging ring to permit tire application and removal.

With the above and other objects in view that will become apparent as the nature of the invention is better understood, the same consists in the novel form, combination and arrangement of parts hereinafter more fully described, shown in the accompanying drawing and particularly pointed out in the appended claim.

In the drawing:

Figure 1 is a transverse section showing the improved rim structure and a tubeless tire mounted thereon, the tire being inflated;

Fig. 2 is a view similar to Fig. 1 but showing the tire collapsed from blow-out or other cause;

Fig. 3 is another transverse section showing the drop-center of the rim in use for changing a tire; and Fig. 4 is still another transverse section showing the construction employed for truck and bus tires.

Preferences have been disclosed in the drawings and will be rather specifically described but attention is invited to the possibility of making variations.

The construction shown shown in Figs. 1 to 3 is appropriate for all vehicles in which tires may be applied and removed without the necessity of providing each rim with a removable bead-engaging flange. For trucks and buses, requiring such removable rings, the construction shown in Fig. 4 may be employed. Reference will first be made to Figs. 1 to 3.

A metal tire-carrying rim 5 is provided having bead seats 6, bead-abutting flanges 7 at the outer edges of said seats 6, and a drop-center portion 8 between said seats 6. These seats may have conventional safety ribs 9 to hold the tire beads 10 thereon in case of blow-out.

A metal safety rim 11 surrounds the tire-carrying rim 5 for reception within the tire 12. This safety rim 11 has an outer peripheral portion 13 of considerably greater diameter than the flanges 7, of considerably less diameter than the tread portion 14 of the tire 12, and of a width somewhat less than the inner transverse diameter of the tire. The safety rim 11 also has a central annular web portion 15 which extends from the peripheral portion 13 to the inner wall 16 of the drop-center portion 8 of the tire-carrying rim 5.

The peripheral portion 13 is preferably of hollow form and of substantially sectorial shape in transverse section, providing it with a transversely curved peripheral wall 17 and with two straight side walls 18 which converge from said wall 17 to the web portion 15. This web portion is preferably formed of two thicknesses of metal 19 integrally joined to the side walls 18 and integrally joined also to the inner wall 16 of the drop-center formation 8.

The entire rim structure is preferably composed of two units welded together at 20 and 21. Each of these units comprises one of the seats 6, one of the flanges 7, half of the drop-center formation 8, one of the metal thicknesses 19, one of the side walls 18, and half of the peripheral wall 17.

With the tire 12 inflated, the safety rim and tire are related as shown in Fig. 1. In case of tire deflation from blow-out or other cause, the descent of the wheel is limited by the peripheral portion 13 of the safety rim 11 engaging the tread portion 14 of the tire 12 as seen in Fig. 2, and smooth rolling of the wheel will continue, permitting the vehicle to be brought to a safe stop. Moreover, there is no danger of rim-cutting the tire.

When changing a tire, the drop-center formation 8 permits bead reception while getting one bead and the associated side wall of the tire past the safety rim 11 as will be clear from Fig. 3. In this connection, it may be explained that the drop-center formation 8 is much deeper than heretofore in order to permit accomplishment of this function. The drop-center formation 8 is also usable as usual to allow the tire beads to pass one of the flanges 7.

In Fig. 4, a tire-carrying rim 22 is shown, said rim being straight in transverse section, having a fixed bead-abutting flange 23 at one edge and having a removable flange-forming ring 24 at its other edge.

A safety rim 25 surrounds the rim 22 between the flanges 23 and 24 and includes an outer peripheral portion 26 which is transversely bowed. This peripheral portion 26 is of considerably greater diameter than the flanges 23—24 and is of considerably less diameter than the tread portion 14ª of the tire 12ª.

The safety rim 25 preferably comprises an inner peripheral wall 27, an outer transversely bowed peripheral wall 28, two edge walls 29 jointed to the edges of said walls 27 and 28, and an internal reinforcing web 30, the latter being formed from two thicknesses of metal 31. Thus, the rim 25 may be formed from two units welded together at 33 and 32, and each unit comprises half of the wall 27, one edge wall 29, half of the wall 28 and one of the web thicknesses 30.

The structure of Fig. 4 acts in the same manner as that of Figs. 1 to 3, in case a blow-out or other cause should deflate the inner tube 34.

In Fig. 1, an inflation valve is shown at 35, and a portion of such a valve is shown at 36 in Fig. 4.

From the foregoing, it will be seen that novel and advantageous provision has been made for attaining the desired ends, and while there are herein shown and described the preferred embodiments of the invention, it is nevertheless to be understood that minor changes may be made therein without departing from the spirit and scope of the invention as claimed.

I claim:

In a deep well wheel rim structure for a tubeless pneumatic tire, a tire-carrying rim having bead seats, bead-abutting flanges at the outer edges of said bead seats, and a drop-center portion between said bead seats; and a safety rim surrounding said tire-carrying rim for disposition within the tire, said safety rim having a continuous web portion disposed substantially centrally in said drop-center portion of said tire-carrying rim and secured to the latter, said safety rim also having a continuous outer peripheral portion secured to said web portion, said drop-center portion being at least as deep on both sides of said web portion as the distance the outer peripheral portion extends radially outwardly beyond the diameter of the bead seats, to facilitate mounting and dismounting of the tire over said outer peripheral portion, said outer peripheral portion being of considerably greater diameter than said bead-abutting flanges and of considerably less diameter than the tread portion of the tire; said outer peripheral portion also having an axial extent substantially equal to the axial extent of said tire tread portion, whereby if the tire becomes deflated wheel descent will be limited by contact of said outer peripheral portion of said safety rim with the tread portion of the tire over the entire inner area of the tread portion, for safety and to avoid rim-cutting; both said web portion and said outer peripheral portion of said safety rim being sufficiently but narrowly spaced from the side walls of said drop-center portion of said tire-carrying rim at substantially all points where the web and outer peripheral portions of the safety rim and the side walls of the drop-center portion of the tire-carrying rim are in spaced opposed relationship to permit easy entrance of the tire beads into said drop-center portion when applying and removing the tire.

References Cited in the file of this patent

UNITED STATES PATENTS

| | | |
|---|---|---|
| 2,102,551 | Woodward | Dec. 14, 1937 |
| 2,127,052 | Von Bon Horst | Aug. 16, 1938 |
| 2,241,858 | Hruska | May 13, 1941 |
| 2,537,442 | Carriker | Jan. 19, 1951 |
| 2,775,282 | Kennedy | Dec. 25, 1956 |

FOREIGN PATENTS

| | | |
|---|---|---|
| 962,439 | France | Dec. 12, 1949 |